US010711834B2

(12) United States Patent
Hamrodi et al.

(10) Patent No.: US 10,711,834 B2
(45) Date of Patent: Jul. 14, 2020

(54) VEHICLE THRUST BEARING

(71) Applicants: OILES CORPORATION, Tokyo (JP); OILES DEUTSCHLAND GMBH, Ober-Moerlen (DE)

(72) Inventors: Robert Hamrodi, Ober-Moerlen (DE); Kai Metzler, Ober-Moerlen (DE); Tsuyoshi Nagashima, Ober-Moerlen (DE); Kouhei Kurose, Fujisawa (JP)

(73) Assignees: OILES CORPORATION, Tokyo (JP); OILES DEUTSCHLAND GMBH, Ober-Moerlen (DE)

( * ) Notice: Subject to any disclaimer, the term of this patent is extended or adjusted under 35 U.S.C. 154(b) by 0 days.

(21) Appl. No.: 16/309,307

(22) PCT Filed: Jun. 24, 2016

(86) PCT No.: PCT/JP2016/068927
§ 371 (c)(1),
(2) Date: Dec. 12, 2018

(87) PCT Pub. No.: WO2017/221428
PCT Pub. Date: Dec. 28, 2017

(65) Prior Publication Data
US 2019/0162229 A1 May 30, 2019

(51) Int. Cl.
*F16C 17/04* (2006.01)
*F16C 35/02* (2006.01)
(Continued)

(52) U.S. Cl.
CPC .............. *F16C 17/04* (2013.01); *B60G 15/06* (2013.01); *F16C 19/10* (2013.01); *F16C 33/20* (2013.01);
(Continued)

(58) Field of Classification Search
CPC ........ F16C 17/04; F16C 17/107; F16C 19/10; F16C 35/02; F16C 33/20; F16C 33/74;
(Continued)

(56) References Cited

U.S. PATENT DOCUMENTS 4,907,289 A * 3/1990 Kamimura ........... B60G 15/068
384/124
8,066,435 B2 * 11/2011 Miyata ................. B60G 15/068
280/124.147
(Continued)

FOREIGN PATENT DOCUMENTS

DE 100 38 267 A1 2/2002
EP 1574741 A1 * 9/2005 ................ F16F 9/58
(Continued)

OTHER PUBLICATIONS

International Search Report of the International Searching Authority dated Aug. 9, 2016 in the corresponding International application No. PCT/JP2016/068927 (and English translation).
(Continued)

*Primary Examiner* — Marcus Charles
(74) *Attorney, Agent, or Firm* — Posz Law Group, PLC

(57) ABSTRACT

A vehicle thrust bearing that can reduce the number of assembly parts used in assembling a suspension of a vehicle to a body and reduce the thickness of parts to simplify the assembling work includes an upper case that is attached to a body of a vehicle having a suspension, and a lower case that is arranged under the upper case so as to be rotatable with respect to the upper case, wherein the upper case includes in a top area thereof a mounting portion for being attached to the body of the vehicle.

6 Claims, 6 Drawing Sheets

(51) Int. Cl.
*F16C 17/10* (2006.01)
*B60G 15/06* (2006.01)
*F16C 19/10* (2006.01)
*F16F 9/32* (2006.01)
*F16C 35/06* (2006.01)
*F16C 33/20* (2006.01)

(52) U.S. Cl.
CPC .............. *F16C 35/02* (2013.01); *F16C 35/06* (2013.01); *F16F 9/32* (2013.01); *B60G 15/068* (2013.01); *B60G 2204/128* (2013.01); *B60G 2204/1242* (2013.01); *B60G 2204/418* (2013.01); *F16C 2208/00* (2013.01); *F16C 2326/05* (2013.01)

(58) Field of Classification Search
CPC .. F16C 33/767; F16C 15/068; F16C 2208/80; F16C 2326/05; B60G 15/067; B60G 2204/128; B60G 2204/1242; B60G 2204/418; B60G 15/068
USPC ....... 384/228, 295, 297, 420, 590, 609, 615, 384/223, 428
See application file for complete search history.

(56) References Cited

U.S. PATENT DOCUMENTS

| | | | | |
|---|---|---|---|---|
| 8,328,427 B2* | 12/2012 | Kellam | ............... | B60G 15/068 384/144 |
| 8,474,846 B2* | 7/2013 | Dubus | ................. | B60G 15/068 188/321.11 |
| 8,740,472 B2* | 6/2014 | Corbett | ............... | B60G 15/067 384/609 |
| 9,091,297 B2* | 7/2015 | Morishige | ............. | F16C 17/107 |
| 9,415,656 B2* | 8/2016 | Sakairi | ................... | F16C 17/10 |
| 2007/0267793 A1* | 11/2007 | Chamousset | ........ | B60G 15/068 267/220 |
| 2010/0008610 A1 | 1/2010 | Kaneko et al. | | |
| 2011/0019951 A1* | 1/2011 | Kaneko | .................. | B60G 11/15 384/420 |
| 2011/0262070 A1* | 10/2011 | Zernickel | ............. | B60G 15/068 384/618 |
| 2013/0142462 A1* | 6/2013 | Morishige | ............... | F16C 17/04 384/130 |
| 2015/0354629 A1* | 12/2015 | Sakairi | .................... | F16C 17/10 384/420 |

FOREIGN PATENT DOCUMENTS

| | | | | |
|---|---|---|---|---|
| EP | 3 178 682 A1 | 6/2017 | | |
| JP | H10-205543 A | 8/1998 | | |
| JP | 2001-099218 A | 4/2001 | | |
| JP | 2004-263773 A | 9/2004 | | |
| JP | 2006322509 A | * 11/2006 | | |
| JP | 2006-328898 A | 12/2006 | | |
| JP | 2008-230279 A | 10/2008 | | |
| JP | 2008232173 A | * 10/2008 | ............. | F16C 19/10 |
| JP | 5029058 B2 | 9/2012 | | |
| WO | 2010/089312 A1 | 8/2010 | | |

OTHER PUBLICATIONS

Extended European Search Report dated Nov. 25, 2019 issued in corresponding EP patent application No. 16906344.3.
Office Action dated Jan. 2, 2020 issued in corresponding KR patent application No. 10-2018-7035892 (and English machine translation).
Office Action dated Sep. 3, 2019 issued in corresponding CN patent application No. 201680086451.9 (and English translation).
Office Action dated Mar. 17, 2020 issued in corresponding CN patent application No. 201680086451.9 (and English translation).

* cited by examiner

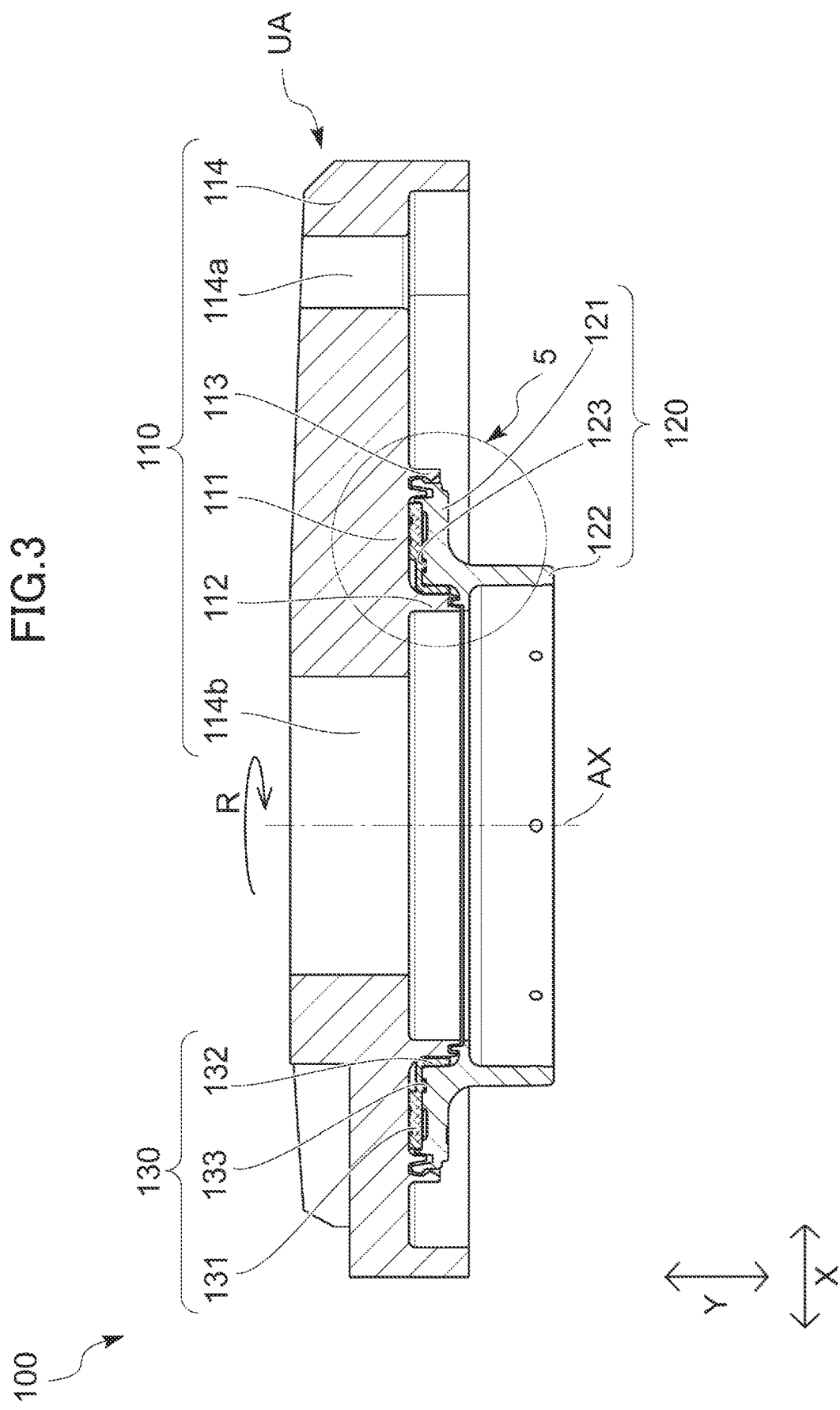

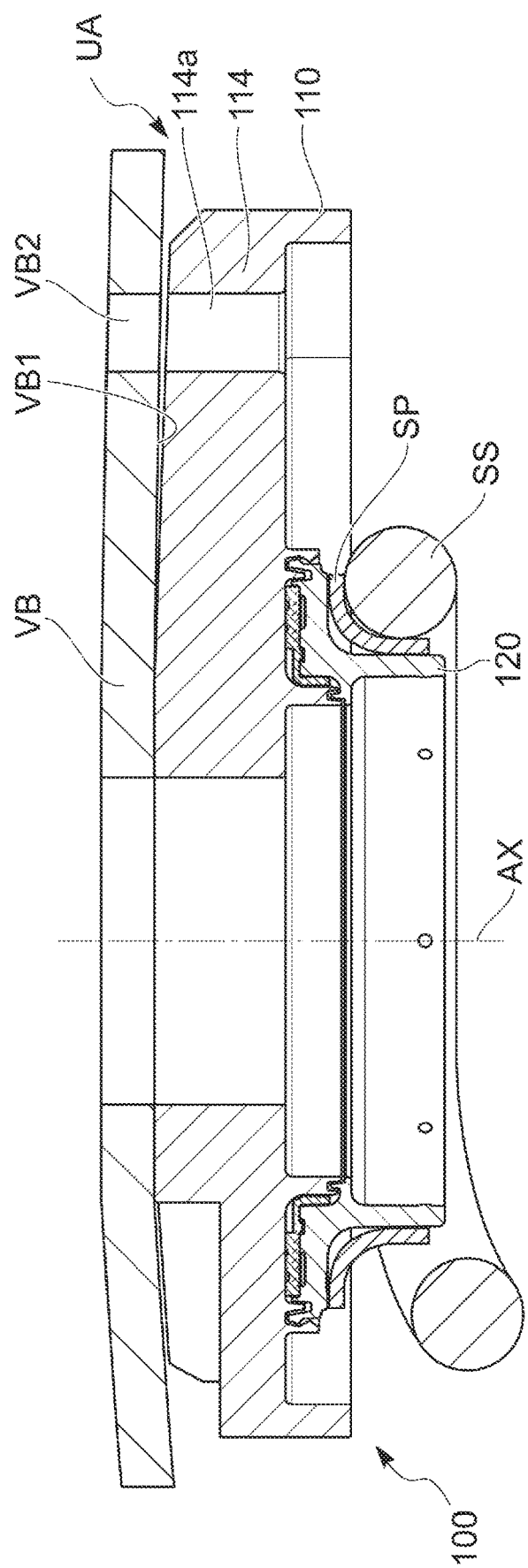

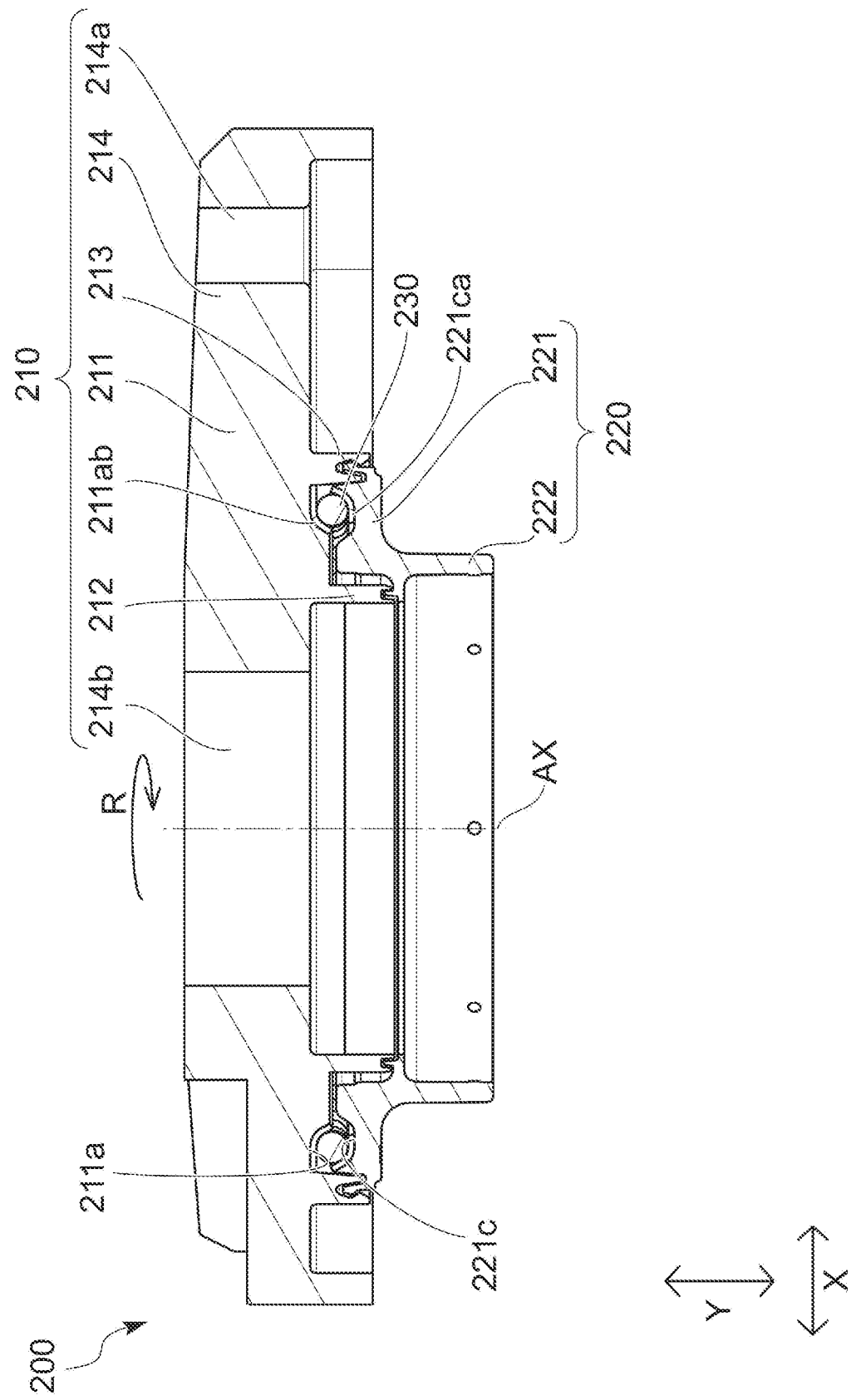

VEHICLE THRUST BEARING

CROSS REFERENCE TO RELATED APPLICATION

This application is a U.S. national stage application of PCT/JP2016/068927 filed on Jun. 24, 2016, the contents of which are incorporated herein by reference.

TECHNICAL FIELD

The present invention relates to a vehicle thrust bearing having an upper case and a lower case that are rotatable with respect to each other. Particularly, the present invention relates to a vehicle thrust bearing that is incorporated into a four-wheeled vehicle as a thrust bearing of a (MacPherson) strut-type suspension or of an air suspension of the vehicle.

BACKGROUND

A strut-type suspension used for front wheels of a four-wheeled vehicle generally has a structure in which a damper coil spring is combined with a strut assembly that incorporates a hydraulic shock absorber therein in an outer cylinder integrated with a main axis.

When a strut assembly rotates with a damper coil spring in a steering operation, one type of strut-type suspension rotates a piston rod of the strut assembly thereof, whereas another type of strut-type suspension doesn't rotate a piston rod of the strut assembly thereof. In both types, a vehicle thrust bearing is used between a mounting mechanism for mounting a strut assembly to a body of a vehicle and an upper end of the dumper coil spring so as to allow the strut assembly to rotate smoothly.

There is a conventional strut bearing that includes an outer wheel that is attached to a body of a vehicle having a strut-type suspension, an inner wheel that overlaps with the outer wheel so as to be rotatable with respect to the outer wheel about an axis center of a piston rod that is used for a shock absorber of the strut-type suspension of the vehicle, and a retainer that is arranged in an annular space created between the outer wheel and the inner wheel to receive a thrust load and a radial load acting from a tire (see Patent Literatures 1 and 2, for example).

PATENT LITERATURE

[Patent Literature 1] Japanese Patent Laid-Open No. 2008-230279 (particularly FIG. 2)
[Patent Literature 2] Japanese Patent No. 5029058 (particularly FIG. 3)

The above-described conventional strut bearing, however, has a problem in which there are a large number of assembling parts and the assembling work is thus complicated, because the strut bearing is attached to a housing, which is a body of a vehicle, via a supporting main part provided separately as a mounting member.

SUMMARY

It is thus an object of the present invention, which has been achieved for addressing the above-described problems of the conventional art, to provide a vehicle thrust bearing that can reduce the number of assembly parts used in attaching a suspension of a vehicle to a body and reduce the thickness of parts to simplify the assembling work.

According to a first aspect of the present invention, a vehicle thrust bearing includes an upper case that is attached to a body of a vehicle having a suspension, and a lower case that is arranged under the upper case so as to be rotatable with respect to the upper case, wherein the upper case includes in a top area thereof a mounting portion for being attached to the body of the vehicle.

According to a second aspect of the present invention, a bearing piece for receiving a thrust load is arranged in an annular space created between the upper case and the lower case.

According to a third aspect of the present invention, the bearing piece is an annular sliding bearing piece made of synthetic resin.

According to a fourth aspect of the present invention, the bearing pieces are a plurality of rolling elements that contact with the upper case and the lower case.

According to a fifth aspect of the present invention, the mounting portion has three body mounting screw holes that are arranged at equal intervals in the circumferential direction of a piston rod.

Because the vehicle thrust bearing of the present invention includes the upper case that is attached to a body of a vehicle having a suspension, and the lower case that is arranged under the upper case so as to be rotatable with respect to the upper case, the upper case and the lower case can rotate smoothly with respect to each other. In addition, the vehicle thrust bearing of the present invention can achieve the following unique effects.

According to the first aspect of the present invention, because the upper case includes in the top area thereof the mounting portion for being attached to the body of the vehicle, the upper case can play a role of a conventional attaching member. Thus, it is possible to reduce the number of parts and to reduce the thickness of parts.

Also, because a conventional mounting member is no longer needed to be assembled with the body of the vehicle independently, it is possible to simplify the work of assembling the vehicle thrust bearing with the body of the vehicle.

Furthermore, the upper case becomes more rigid in comparison with a conventional thrust bearing in which an upper case member and a mounting member are provided separately. Thus, the strength of the vehicle thrust bearing can be increased.

According to the second aspect of the present invention, because the lower case and the upper case indirectly contact with each other to receive a thrust load acting from a tire at a contact portion and the bearing piece for receiving a thrust load is arranged in the annular space created between the upper case and the lower case, the friction resistance between the upper case and the lower case is reduced. Thus, the upper case and lower case can rotate more smoothly with respect to each other.

According to the third aspect of the present invention, because the bearing piece is an annular sliding bearing piece made of synthetic resin, the annular sliding bearing piece is formed by a single member. Thus, it is possible to manufacture a vehicle thrust bearing with a higher regard for durability.

Also, because a vibration doesn't occur when the upper case and the lower case rotate with regard to each other, it is possible to provide quiet rotation.

According to the fourth aspect of the present invention, because the bearing pieces are the plurality of rolling elements that contact with the upper case and the lower case, the rolling elements roll when the upper case and the lower case rotate with regard to each other. Thus, it is possible to manufacture a vehicle thrust bearing with a higher regard for friction resistance to rotate with small friction force.

According to the fifth aspect of the present invention, because the mounting portion has the three body mounting screw holes that are arranged at equal intervals in the circumferential direction of a piston rod, the vehicle thrust bearing itself is directly attached to the body of the vehicle by aligning three body-side screw holes on an attaching portion of the body and the three body mounting screw holes of the upper case. Thus, it is possible for the vehicle thrust bearing to be screwed on the body of the vehicle with three sets of bolts and nuts in assembling operation.

BRIEF DESCRIPTION OF DRAWINGS

FIG. 3 is a cross-sectional view as taken along line 3-3 of FIG. 2A.

FIG. 4 is a cross-sectional view showing a state in which the vehicle thrust sliding bearing of the present invention is incorporated into a strut-type suspension.

FIG. 6 is a cross-sectional view of a vehicle thrust rolling bearing as a second embodiment of the present invention.

DETAILED DESCRIPTION

The present invention may be embodied in any form as long as a vehicle thrust bearing as an embodiment of the present invention includes an upper case that is attached to a body of a vehicle having a suspension, and a lower case that is arranged under the upper case so as to be rotatable with respect to the upper case, wherein the upper case includes in a top area thereof a mounting portion for being attached to the body of the vehicle, for reducing the number of assembly parts used in attaching the suspension of the vehicle and reducing the thickness of parts to simplify the assembling work.

For example, the vehicle thrust bearing may include a bearing piece that is arranged in an annular space created between the upper case and the lower case for receiving a thrust load acting from a tire, or may not include such bearing piece so that the upper case and the lower case can directly slide on each other.

If the vehicle thrust bearing includes the bearing piece, the bearing piece may be a sliding bearing piece that slides with respect to the upper case or the lower case, or may be a rolling element such as a ball which plays a role of a rolling bearing piece to rotatably contact with the upper case and the lower case.

The suspension of the vehicle may be embodied in any form as long as the suspension has a structure for receiving a thrust load acting from a tire.

First Embodiment

A vehicle thrust sliding bearing 100, which is a vehicle thrust bearing as a first embodiment of the present invention, will now be described with reference to FIGS. 1 to 5.

Figure 1:
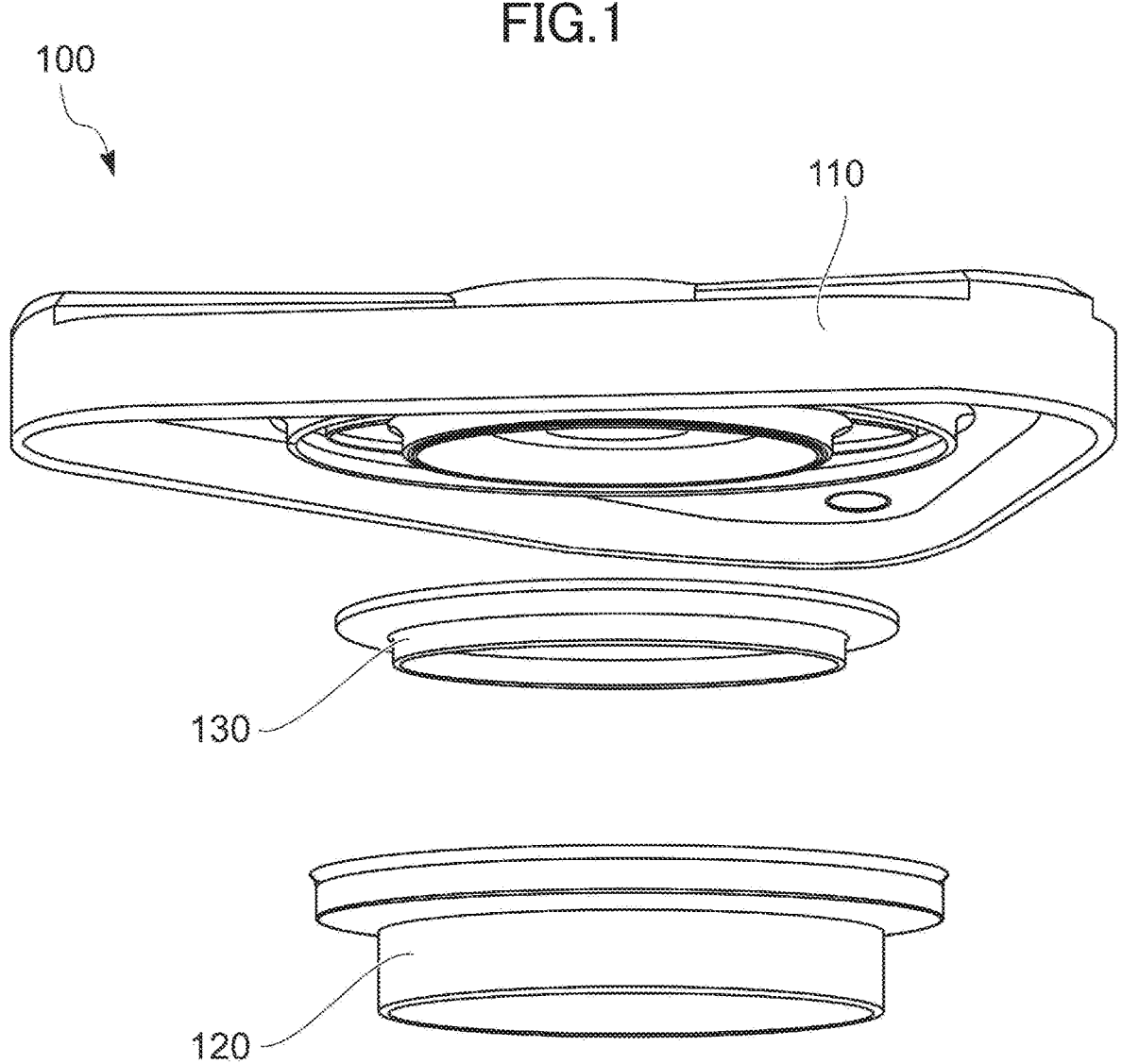
FIG. 1 is an exploded bottom perspective view of a vehicle thrust sliding bearing as a first embodiment of the present invention.
Figure 2A:
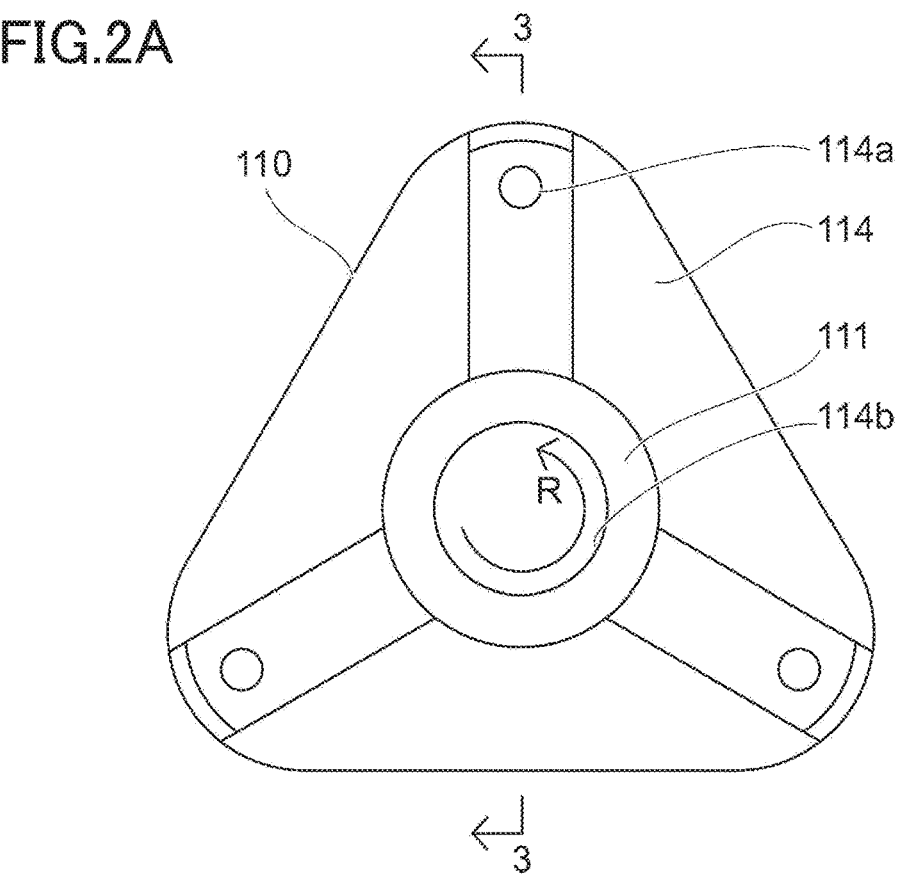
FIG. 2A is a plane view of the vehicle thrust sliding bearing as the first embodiment of the present invention.
Figure 2B:
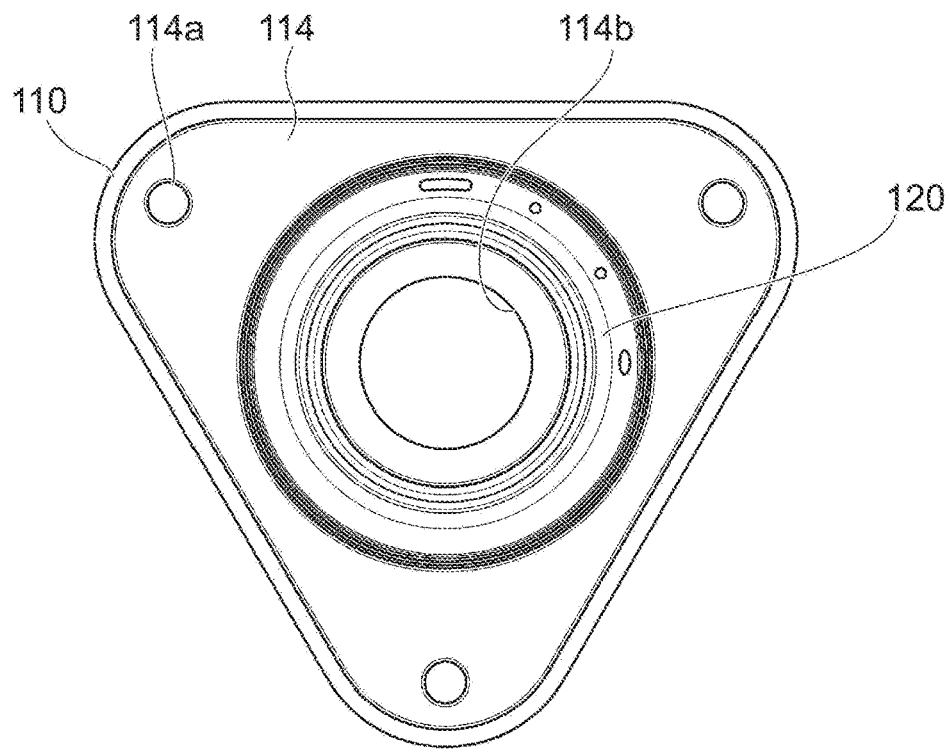
FIG. 2B is a bottom view of the vehicle thrust sliding bearing as the first embodiment of the present invention.
Figure 5:
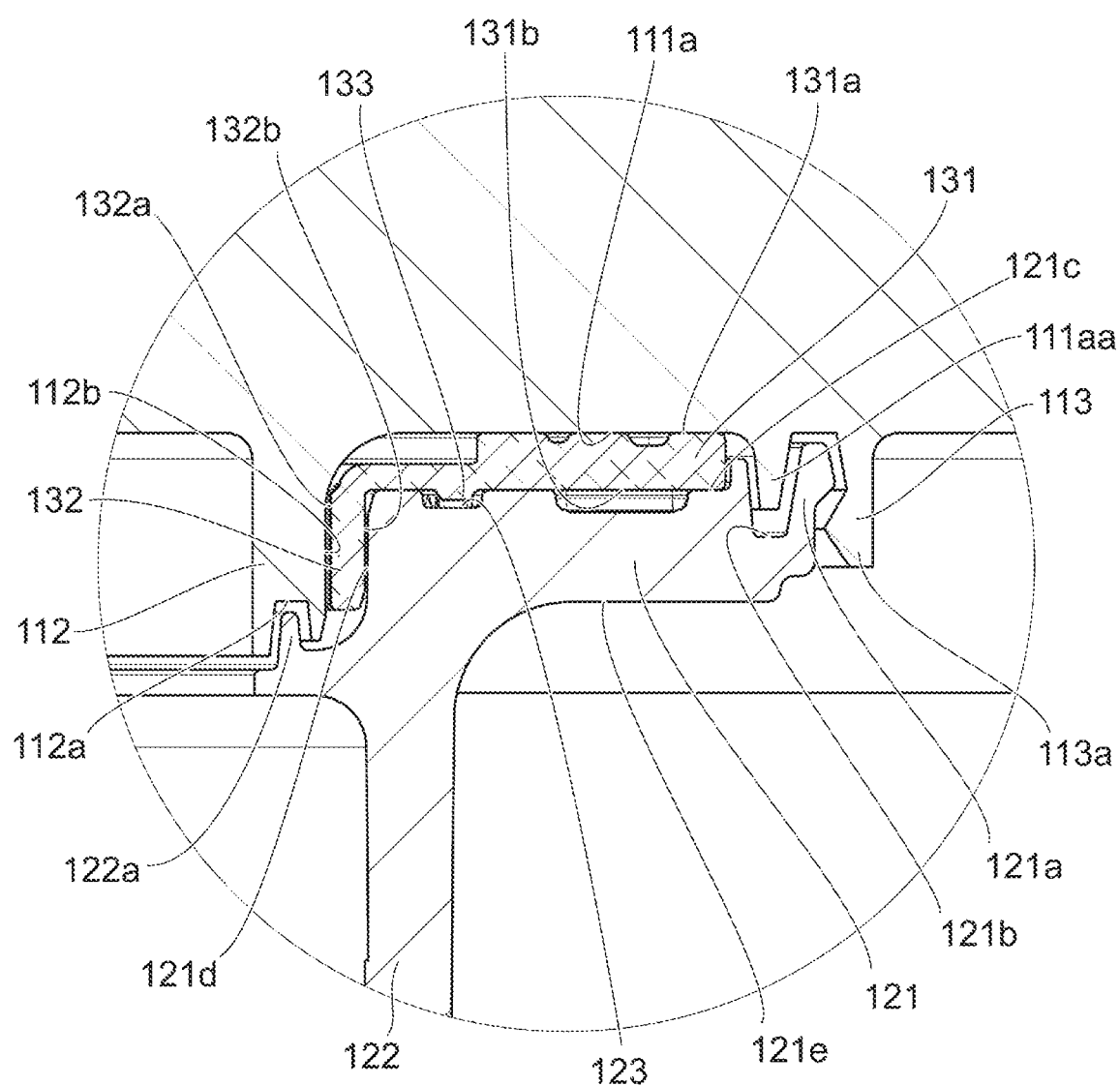
FIG. 5 is an enlarged cross-sectional view of portion 5 in FIG. 3.

FIG. 1 is an exploded bottom perspective view of the vehicle thrust sliding bearing 100 as the first embodiment of the present invention. FIG. 2A is a plane view of the vehicle thrust sliding bearing 100 as the first embodiment of the present invention. FIG. 2B is a bottom view of the vehicle thrust sliding bearing 100 as the first embodiment of the present invention. FIG. 3 is a cross-sectional view as taken along line 3-3 of FIG. 2A. FIG. 4 is a cross-sectional view showing a state in which the vehicle thrust sliding bearing 100 of the present invention is incorporated into a strut-type suspension. FIG. 5 is an enlarged cross-sectional view of portion 5 in FIG. 3.

As illustrated in FIGS. 1 to 5, the vehicle thrust sliding bearing 100 as the first embodiment of the present invention includes an upper case 110 made of synthetic resin, a lower case 120 made of synthetic resin, and an annular sliding bearing piece 130 as a bearing piece made of synthetic resin.

The upper case 110 is created by integrally forming an annular upper case base 111 that forms an annular upper case bottom surface 111a and is attached to the vehicle in a thrust direction Y of a piston rod, an inner circumferential cylindrical portion 112 that downwardly extends from an inner circumferential side in a radial direction X of the upper case base 111, an outer circumferential cylindrical portion 113 that downwardly extends from an outer circumferential side in the radial direction X of the upper case base 111, and a mounting portion 114 for attaching a top area UA of the upper case 110 to a body VB of the vehicle.

Thus, a conventional mounting member is no longer needed to be attached to the body VB of the vehicle independently.

Furthermore, the upper case 110 becomes more rigid in comparison with a conventional thrust bearing in which an upper case member and a mounting member are provided separately.

Also, because the upper case 110 includes the mounting portion 114, the thickness of pieces is reduced in comparison with a conventional upper case in which members thereof are provided separately. Thus, it is possible to expand a setting range of a damper coil spring SS.

In other words, by expanding a setting range of a spring constant, it is possible to expand a degree of freedom of adjustment for a comfortable ride.

Furthermore, the vehicle thrust sliding bearing 100 itself is directly attached to the body VB of the vehicle.

The lower case 120 is configured to be arranged under the upper case 110 so as to be rotatable about an axis center AX of the piston rod with respect to the upper case 110.

In the present embodiment, the lower case 120 is created by integrally forming an annular lower case base 121 that is arranged under the upper case 110 so as to be rotatable about the axis center AX with respect to the upper case 110, and an inner circumferential cylindrical portion 122 that downwardly extends from an inner circumferential side in a radial direction of the lower case base 121.

An inner annular engaging claw 121a is formed on a radial outer side of the lower case base 121. The inner annular engaging claw 121a engages with an outer annular engaging claw 113a formed on an outer cylinder portion 113 of the upper case 110 in a rotatable manner in a circumferential direction R.

An outer annular engaging groove 121b is formed radially inward of the inner annular engaging claw 121a of the lower case base 121. The outer annular engaging groove 121b engages, via a small gap, with an outer annular engaging ridge 111aa formed on the upper case bottom surface 111a of the upper case base 111.

This prevents an extraneous substance from entering into an annular space created between the upper case 110 and the lower case 120 from radial outside of the annular space.

Furthermore, an inner annular engaging ridge 122a is formed at an inner side of the inner circumferential cylindrical portion 122 of the lower case 120. The inner annular engaging ridge 122a engages with an inner annular engaging groove 112a formed on a lower end of the inner circumferential cylindrical portion 112 of the upper case 110 such that a small gap is created between the inner annular engaging ridge 122a and the inner annular engaging groove 112a.

This prevents an extraneous substance from entering into the annular space created between the upper case 110 and the lower case 120 from radial inside of the annular space.

The annular sliding bearing piece 130 is configured to exist in the annular space created between the upper case 110 and the lower case 120 for receiving thrust and radial loads acting from a tire.

In the present embodiment, the annular sliding bearing piece 130 is arranged in an annular space between the upper case bottom surface 111a of the upper case base 111 and a lower case top surface 121c of the lower case base 121 as well as in an annular space between an outer circumferential surface 112b of the inner circumferential cylindrical portion 112 and an inner circumferential surface 121d of the lower case base 121.

The annular sliding bearing piece 130 includes an annular thrust sliding bearing piece portion 131, a cylindrical radial sliding bearing piece portion 132, and an anti-rotation projecting portion 133 that downwardly projects from the thrust sliding bearing piece portion 131.

The thrust sliding bearing piece portion 131 includes a bearing top surface 131a that slidably contacts with the upper case bottom surface 111a of the upper case base 111, and a bearing bottom surface 131b that contacts with the lower case top surface 121c of the lower case base 121 of the lower case 120.

On the other hand, the radial sliding bearing piece portion 132 includes a bearing inner circumferential surface 132a that slidably contacts with the outer circumferential surface 112b of the inner circumferential cylindrical portion 112 of the upper case 110, and a bearing outer circumferential surface 132b that contacts with the inner circumferential surface 121d of the lower case base 121 of the lower case 120.

The anti-rotation projecting portion 133 engages with an anti-rotation concave portion 123 formed on the lower case top surface 121c of the lower case 120 to restrict the rotation of the annular sliding bearing piece 130 with respect to the lower case 120.

In the present embodiment, as one example, the anti-rotation projecting portion 133 and the anti-rotation concave portion 123 are provided so that the annular sliding bearing piece 130 does not rotate with respect to the lower case 120. Alternatively, the anti-rotation projecting portion 133 and the anti-rotation concave portion 123 may not be provided so that the annular sliding bearing piece 130 can rotate with respect to the lower case 120.

As shown in FIG. 4, a spring pad SP made of rubber and formed in annular shape is arranged on a lower case bottom surface 121e of the lower case base 121.

In a (MacPherson) strut-type suspension, the vehicle thrust sliding bearing 100 is incorporated into the (MacPherson) strut-type suspension by being aligned between a body-side bearing surface VB1 of the body VB of the vehicle and the damper coil spring SS. This is achieved by directly contacting a top surface of the mounting portion 114 of the upper case 110 with the body-side bearing surface VB1 of the body VB of the vehicle and, on the other hand, by contacting a spring pad SP with an upper end of the damper coil spring SS.

Also, the upper case 110 includes three body mounting screw holes 114a that are arranged at equal intervals in the circumferential direction R, which is a circumferential direction of the piston rod.

Three body-side screw holes VB2 corresponding to the three body mounting screw holes 114a are arranged in attaching portions, to which the upper case 110 is attached, in the body VB of the vehicle. This makes it possible to align the body-side screw holes VB2 and the body mounting screw holes 114a so as to directly attach the upper case 110 to the body VB of the vehicle with unshown bolts and nuts.

In this embodiment, the three body mounting screw holes 114a and three body-side screw holes VB2 are arranged at equal intervals in the circumferential direction R. However, more than three body mounting screw holes 114a and three body-side screw holes VB2 may be provided or may be arranged at different intervals.

That's because similar effects can be achieved in such cases.

Also, in the center of the mounting portion 114, a piston rod engaging hole 114b is formed to engage with the top end of the piston rod.

With the above-described vehicle thrust sliding bearing 100, which is a vehicle thrust bearing as the first embodiment of the present invention, because the upper case 110 includes in the top area UA of the upper case 110 the mounting portion 114 for being attached to the body VB of the vehicle, it is possible to omit a part whose role is now played by the upper case 110 to reduce the total number of parts and reduce the thickness of parts. It is also possible to simplify the work of assembling the vehicle thrust sliding bearing 100 with the body VB of the vehicle. Furthermore, the strength of the vehicle thrust sliding bearing 100 can be increased in comparison with a conventional vehicle thrust sliding bearing in which an upper case member and a mounting member are provided separately.

Furthermore, because the bearing piece is the annular sliding bearing piece 130 made of synthetic resin, it is possible to provide quiet rotation as well as to manufacture the vehicle thrust sliding bearing 100 with a higher regard for durability.

Furthermore, because the mounting portion 114 includes the three body mounting screw holes 114a that are arranged at equal intervals in the circumferential direction of the piston rod, it is possible to screw the vehicle thrust bearing 100 on the body VB of the vehicle with three sets of bolts and nuts in assembling operation.

Second Embodiment

Secondly, a vehicle thrust rolling bearing 200, which is a vehicle thrust bearing as a second embodiment of the present invention, will now be described with reference to FIG. 6.

FIG. 6 is a cross-sectional view of the vehicle thrust rolling bearing 200 as the second embodiment of the present invention.

The vehicle thrust rolling bearing 200 as the second embodiment of the present invention replaces the annular sliding bearing piece 130 of the vehicle thrust sliding bearing 100 in the first embodiment of the present invention with a plurality of rolling elements 230 (rolling bearing pieces) such as balls. Thus, many elements in the vehicle rolling bearing 200 are common with elements in the vehicle thrust sliding bearing 100 in the first embodiment. Thus, common elements won't be described in detail and will be provided with reference characters of a 200 number that has the common last two digits. Therefore, each the following parts in FIG. 6, has the reference number that follows the part name: inner circumferential cylindrical portion 212; outer circumferential cylindrical portion 213; body mounting screw hole 214a; piston rod engaging hole 214b; lower case base 221; and inner circumferential cylindrical portion 222.

As illustrated in FIG. 6, the plurality of rolling elements 230 of the vehicle thrust rolling bearing 200 as the second embodiment of the present invention are configured to be arranged in an annular space created between an upper case 210 and a lower case 220 to contact with the upper case 210 and the lower case 220.

Specifically, an upper case-side annular rail 211ab made of metal as an example is assigned on an upper case bottom surface 211a of the upper case 210. The upper case-side annular rail 211ab is configured to contact with the upper side in Y axis direction and inner side in X axis direction of the rolling element 230.

On the other hand, a lower case-side annular rail 221ca made of metal as an example is assigned on a lower case top surface 221c of the lower case 220. The lower case-side annular rail 221ca is configured to contact with the lower side in Y axis direction and outer side in X axis direction of the rolling element 230.

This makes it possible for the rolling elements 230 to rotate when the upper case 210 and the lower case 220 rotate with regard to each other.

With the above-described vehicle thrust rolling bearing 200, which is a vehicle thrust bearing as the second embodiment of the present invention, because the bearing pieces are the plurality of rolling elements 230 that contact with the upper case 210 and the lower case 220, it is possible to manufacture a vehicle thrust bearing with a higher regard for friction resistance to rotate with a small friction force.

The invention claimed is:

1. A vehicle thrust bearing comprising: an upper case that is attached to a body of a vehicle having a suspension; and
    a lower case that is arranged under the upper case to be rotatable with respect to the upper case, wherein
    the upper case includes
        an upper case base having an outer circumferential cylindrical portion, and
        a mounting portion that is integrally formed with the outer circumferential cylindrical portion and is located outward of the outer circumferential cylindrical portion, and
    the upper case is attached to the body of the vehicle via the mounting portion.

2. The vehicle thrust bearing according to claim 1, wherein a bearing piece for receiving a thrust load is arranged in an annular space created between the upper case and the lower case.

3. The vehicle thrust bearing according to claim 2, wherein the bearing piece is an annular sliding bearing piece made of synthetic resin.

4. The vehicle thrust bearing according to claim 2, wherein the bearing pieces are a plurality of rolling elements that contact with the upper case and the lower case.

5. The vehicle thrust bearing according to claim 1, wherein the mounting portion has three body mounting screw holes that are arranged at equal intervals in a circumferential direction of a piston rod.

6. The vehicle thrust bearing according to claim 1, wherein the mounting portion and the outer circumferential cylindrical portion are integrally formed of the same material.

* * * * *